(12) United States Patent
Frasier

(10) Patent No.: US 6,244,327 B1
(45) Date of Patent: Jun. 12, 2001

(54) METHOD OF MAKING SINGLE-CAST, HIGH-TEMPERATURE THIN WALL STRUCTURES HAVING A HIGH THERMAL CONDUCTIVITY MEMBER CONNECTING THE WALLS

(75) Inventor: Donald J. Frasier, Greenwood, IN (US)

(73) Assignee: Allison Engine Company, Inc., Indianapolis, IN (US)

( * ) Notice: Subject to any disclaimer, the term of this patent is extended or adjusted under 35 U.S.C. 154(b) by 0 days.

(21) Appl. No.: 09/207,192

(22) Filed: Dec. 8, 1998

Related U.S. Application Data

(62) Division of application No. 08/896,883, filed on Jul. 18, 1997, now Pat. No. 5,924,483, which is a division of application No. 08/474,308, filed on Jun. 7, 1995, now Pat. No. 5,810,552, which is a continuation-in-part of application No. 08/201,899, filed on Feb. 25, 1994, now Pat. No. 5,545,003, which is a division of application No. 07/838,154, filed on Feb. 18, 1992, now Pat. No. 5,295,530.

(51) Int. Cl.$^7$ .............................. B22C 9/00; B22C 9/04; B22D 39/06

(52) U.S. Cl. ..................... 164/34; 164/516; 164/133; 164/137

(58) Field of Search ................... 164/34, 35, 137, 164/516, 366, 133

(56) References Cited

U.S. PATENT DOCUMENTS

| | | |
|---|---|---|
| 2,096,679 | 10/1937 | Gibson . |
| 3,014,692 | 12/1961 | Turner . |
| 3,192,578 | 7/1965 | McCormick . |
| 3,497,277 | 2/1970 | Malott . |
| 3,527,544 | 9/1970 | Allen . |
| 3,529,905 | 9/1970 | Meginnis . |
| 3,560,107 | 2/1971 | Helms . |
| 3,584,972 | 6/1971 | Bratkovich . |
| 3,603,599 | 9/1971 | Laird . |

(List continued on next page.)

FOREIGN PATENT DOCUMENTS

| | | |
|---|---|---|
| 464755 | 12/1968 | (CH) . |
| 32246881 | 12/1981 | (DE) . |
| 0 326 508 | 1/1989 | (EP) . |
| 0 370 751 | 11/1989 | (EP) . |
| 2056342 | 8/1980 | (GB) . |
| 60/177946 | 9/1985 | (JP) . |

OTHER PUBLICATIONS

F. Colucci, "*Heat is Power*", Aug. 1992, vol. 4, No. 3, Aerospace Materials.

Stuart Uram, CERTECH Incorporated,*Commerical Application of Ceramic Cores*, 26th Annual Meeting of Investment Casting Institute, 1978, pp. 10:1–10:12.

Stuart Uram, CERTECH Incorporated,*Assembly of Ceramic Cores to Form Complex Passageways*, 29th Annual Meeting of the Investment Casting Institute, pp. 4a:01–4A:10.

Robert A. Horton, PCC Airfoils, Inc., Investment Casting, Molding and Casting Processes, pp. 253–269.

*Primary Examiner*—Harold Pyon
*Assistant Examiner*—I.-H. Lin
(74) *Attorney, Agent, or Firm*—Woodard, Emhardt, Naughton, Moriarty & McNett

(57) ABSTRACT

Disclosed is an integral single-cast multi wall structure including a very thin wall and a second thin wall. There is a passageway interposed between the pair of walls of the structure, and a high thermal conductivity member extends into said passageways and thermally couples the walls. The high thermal conductivity member increases the heat transfer between the walls of the structure. The present invention further includes a method for casting an integral structure having very thin walls that utilizes the high thermally conductive member in the casting process to hold the pattern and cores in alignment.

25 Claims, 6 Drawing Sheets

U.S. PATENT DOCUMENTS

| | | |
|---|---|---|
| 3,606,572 | 9/1971 | Schwedland . |
| 3,606,573 | 9/1971 | Emmerson et al. . |
| 3,610,769 | 10/1971 | Schwedland . |
| 3,616,125 | 10/1971 | Powling . |
| 3,619,082 | 11/1971 | Meginnis . |
| 3,644,059 | 2/1972 | Bryan . |
| 3,644,060 | 2/1972 | Bryan . |
| 3,659,645 | 5/1972 | Rose . |
| 3,662,816 * | 5/1972 | Bishop et al. . |
| 3,672,787 | 6/1972 | Thostenson . |
| 3,695,778 | 10/1972 | Taylor . |
| 3,698,834 | 10/1972 | Meginnis . |
| 3,700,418 | 10/1972 | Mayeda . |
| 3,709,632 | 1/1973 | Emmerson et al. . |
| 3,719,365 | 3/1973 | Emmerson et al. . |
| 3,726,604 | 4/1973 | Helms et al. . |
| 3,732,031 | 5/1973 | Bowling et al. . |
| 3,762,032 | 10/1973 | Bowling et al. . |
| 3,806,276 | 4/1974 | Aspinwall . |
| 3,810,711 | 5/1974 | Emmerson et al. . |
| 3,825,984 | 7/1974 | Linko et al. . |
| 3,834,001 | 9/1974 | Carroll et al. . |
| 3,864,199 | 2/1975 | Meginnis . |
| 3,933,442 | 1/1976 | Carroll et al. . |
| 3,950,114 | 4/1976 | Helms . |
| 3,963,368 | 6/1976 | Emmerson . |
| 4,004,056 | 1/1977 | Carroll . |
| 4,008,568 | 2/1977 | Spears, Jr. et al. . |
| 4,042,162 | 8/1977 | Meginnis et al. . |
| 4,077,458 | 3/1978 | Hayashi et al. . |
| 4,086,311 | 4/1978 | Huseby et al. . |
| 4,097,291 | 6/1978 | Huseby et al. . |
| 4,141,213 | 2/1979 | Ross . |
| 4,148,350 | 4/1979 | Rossman . |
| 4,156,614 | 5/1979 | Greskovich et al. . |
| 4,195,475 | 4/1980 | Verdouw . |
| 4,232,527 | 11/1980 | Reider . |
| 4,244,178 | 1/1981 | Herman et al. . |
| 4,245,769 | 1/1981 | Meginnis . |
| 4,249,291 | 2/1981 | Grondahl et al. . |
| 4,283,835 | 8/1981 | Obrochta et al. . |
| 4,296,606 | 10/1981 | Reider . |
| 4,302,940 | 12/1981 | Meginnis . |
| 4,312,186 | 1/1982 | Reider . |
| 4,376,004 | 3/1983 | Bratton et al. . |
| 4,382,534 | 5/1983 | Kwan . |
| 4,384,607 | 5/1983 | Wood et al. . |
| 4,416,321 | 11/1983 | Goddard et al. . |
| 4,421,153 | 12/1983 | Wilkerson et al. . |
| 4,422,229 | 12/1983 | Sadler et al. . |
| 4,427,742 | 1/1984 | Willgoose et al. . |
| 4,434,835 | 3/1984 | Willgoose . |
| 4,453,588 | 6/1984 | Goulette et al. . |
| 4,456,428 | 6/1984 | Cuvillier . |
| 4,548,255 | 10/1985 | Reiner . |
| 4,552,198 | 11/1985 | Mills et al. . |
| 4,574,451 | 3/1986 | Smashey et al. . |
| 4,587,700 | 5/1986 | Curbishley et al. . |
| 4,714,101 | 12/1987 | Terkelsen . |
| 4,724,891 | 2/1988 | Brookes . |
| 4,747,543 | 5/1988 | Madden . |
| 4,804,311 | 2/1989 | Anderson et al. . |
| 4,811,778 * | 3/1989 | Allen et al. . |
| 4,849,030 | 7/1989 | Darolia et al. . |
| 4,851,188 | 7/1989 | Schaefer et al. . |
| 4,862,947 | 9/1989 | Horton et al. . |
| 4,888,069 | 12/1989 | Duhl et al. . |
| 4,908,183 | 3/1990 | Chin et al. . |
| 4,940,073 | 7/1990 | Jeyarajan et al. . |
| 4,971,652 | 11/1990 | Azad . |
| 4,986,333 | 1/1991 | Gartland . |
| 5,080,284 | 1/1992 | Cires . |
| 5,113,650 | 5/1992 | Junior et al. . |
| 5,234,045 | 8/1993 | Cisko . |
| 5,291,654 | 3/1994 | Judd et al. . |
| 5,295,530 * | 3/1994 | O'Connor et al. . |
| 5,328,331 | 7/1994 | Bunker et al. . |
| 5,582,245 * | 12/1996 | Niimi ................................ 165/154 |

\* cited by examiner

METHOD OF MAKING SINGLE-CAST, HIGH-TEMPERATURE THIN WALL STRUCTURES HAVING A HIGH THERMAL CONDUCTIVITY MEMBER CONNECTING THE WALLS

RELATED APPLICATIONS

This is a divisional application of U.S. patent application Ser. No. 08/896,883 filed Jul. 18, 1997, which issued as U.S. Pat. No. 5,924,483 on Jul. 20, 1999. U.S. Pat. application Ser. No. 08/896,883 is a divisional application of U.S. patent application Ser. No. 08/474,308 filed on Jun. 7, 1995, which issued as U.S. Pat. No. 5,810,552 on Sep. 22, 1998. U.S. patent application Ser. No. 08/474,308 is a continuation-in-part of U.S. patent application Ser. No. 08/201,899 filed Feb. 25, 1994, which issued as U.S. Pat. No. 5,545,003 on Aug. 13, 1996. U.S. patent application Ser. No. 08/201,899 is a divisional of U.S. patent application Ser. No. 07/838,154 filed Feb. 18, 1992 which issued as U.S. Pat. No. 5,295,530 on Mar. 22, 1994.

FIELD OF THE INVENTION

This invention relates to single-cast, high-temperature, thin wall structures and methods of making the same. More particularly this invention relates to thin wall hollow structures having high thermal conductivity members connecting therebetween that are capable of withstanding impinging gases at high temperatures.

BACKGROUND OF THE INVENTION

Thick walled one-piece alloy structures are disclosed in U.S. Pat. Nos. 3,806,276 and 3,192,578. Laminated structures having thin walls capable of withstanding of high temperature impinging gases have heretofore been known. By way of example, such structures are disclosed in U.S. Pat. Nos. 4,245,769; 4,042,162; 4,004,056; 3,963,368; 3,950,114; 3,933,442; 3,810,711; 3,732,031; 3,726,604; 3,698,834; 3,700,418; 3,644,059; 3,644,060; 3,619,082; 3,616,125; 3,610,769; 3,606,769; 3,606,572; 3,606,572; 3,606,573; 3,584,972; 3,527,544; 3,529,905 and 3,497,277. The thin walls of such structures are laminated to another thin wall or to a substantially thicker structure by brazing, welding or otherwise bonding. The laminating process involves high temperature brazing, welding or bonding materials that directly affect the alloy or otherwise limit the overall high temperature performance of the structure. Further, these thin wall layers often have holes formed therein by mechanical means or etching which is time consuming, labor intensive and expensive. Although these laminated thin wall structures are capable of withstanding impinging gases at temperatures higher than the melting point of alloys which the structures are made from, the process of making the structures is time consuming, labor intensive and extremely expensive.

Many prior art methods of casting hollow structures utilize ceramic cores. It has been generally accepted that these core must have a density sufficiently low enough such that the core is compressive so that it gives as molten allow solidifies around the core. It has generally been accepted that if the core has a density above 60 to 70 percent, the core will be crushed and broken by molten alloy which solidifies around it. It has also generally been accepted that cores having a thickness less than 0.03 inches with such low density less would be crushed and broken during casting. The density of prior art ceramic cores ranges from about 50 to about 60 percent.

Although 100 percent quartz rods having 100 percent density have been used, such use has been limited to making bent and straight holes or central passageways. heretofore, a high density ceramic core (above 70 to 99 percent plus density) has not been used to make a radial passageway. Generally, in turbine engine components such as turbine blades, such radial passageways parallel the outer thin wall of the component or turbine blade.

It is generally accepted that the use of a high density material for a large core will break the metal. As molten alloy solidifies around a large high density core, the metal shrinks faster than the core and will break due to the high density core. Thus, those skill in the art use low density cores to compensate for the fast rate of shrink of the molten metal and to prevent the metal from breaking.

Another problem recognized by those skilled in the art is the problem of shape distortion during casting. Heretofore, it has been generally accepted that this shape distortion of the casted part is caused by what is known as "mold buckle". This "mold buckle" occurs in the process of building up the shell around the core and pattern. If one of the successive shell layers does not sufficiently dry, the layer moves away from the pattern causing the mold to "buckle" and causes a distorted casting shape. Heretofore, it was not recognized that casting shape distortion could be caused by shell creep.

In prior art methods of making laminated thin wall structures such as gas turbine blades, the thin walls are provided by metal which has been cold rolled to a very thin thickness. The cold-rolled metal is then etched or machined to provide small holes in the surface thereof. The small holes provide a cooling air film over the thin wall as the gas turbine blade is impinged with hot gases. This cold-rolled metal must be formed and bonded (or welded sufficiently to provide heat transfer from the thin wall to the main body of the blade) in a curved shape to produce the outer wall of a turbine blade. The forming process may result in the distortion of the holes in the wall. If the holes are not properly positioned, or the metal not sufficiently bonded, it is possible to develop hot spots at certain section on the blade which would be undesirable and would limit production yields. Further, the cold-rolled material must be later heat treated which also could possibly result in varying heat transfer properties across the surface of the blade which also would be undesirable.

Other casting problems are caused by ceramic cores which are extremely brittle and fragile. These problems increase with decreasing thickness and density.

Heretofore, there has been a need for single-cast, high-temperature, thin wall hollow structures and means for making the same which is quick, relatively inexpensive and not labor intensive. A means for satisfying this need has theretofore escaped those skilled in the art.

SUMMARY OF THE INVENTION

The present invention includes the discovery of a variety of phenomena and agencies which gave rise to an idea of a means for repeatably and reliably producing or casting thin multi wall hollow structures having high thermal conductivity members connecting therebetween with dimensional accuracy and having the wall thickness less than about 0.03 inches. The following statements, by way of example, highlight the discoveries which are part of the present invention as a whole.

The invention includes the discovery that the problem of creep of a ceramic shell can be solved by controlling the injection pressure of the molten alloy into a cavity. The injection pressure may be controlled as a function of time to cast walls having a thickness less than about 0.03 inches without shell creep.

The invention includes the discovery that the injection pressure of an alloy into a cavity can be varied as a function of time by using a control orifice to bleed the head pressure off after the thin cavity has been filled.

The invention includes the discovery that very thin passageways of about 0.005 to 0.015 inches can be formed using a thin core having a density greater than about 70 percent, and preferably about 99 percent or greater.

The invention includes the discovery that a thin core having a thickness of about 0.005 to 0.015 inches and a density greater than about 70 percent will not be crushed and broken when surrounded by solidifying alloy.

The invention includes the discovery that such thin cores can be used to form narrow radial passageways, having a width of about 0.005 to about 0.015 inches, in casting and such passageway can be formed substantially parallel to a thin outer wall having a thickness of about 0.005 to about 0.03 inches.

The invention includes the discovery that cores having a thickness of 0.005 to 0.015 inches can be used in core making, pattern making and casting process without reducing yields.

The invention includes the discovery that a structure can be cast using high thermal conductivity rods, preferably NiAl, having a minimum dimension in the range of about 0.005 to about 0.55 inches that connect between the walls in the thin wall structure and hold the above-described thin core in place during casting. These high thermal conductivity rods can be of any shape.

The invention includes the discovery that a pocket can be drilled into a ceramic core so as to receive and hold such as a narrow diameter rod.

The invention includes the discovery that a single-piece, hollow multi-wall structure having a very thin outer wall, an inner wall and a very thin passageway therebetween can be cast using a ceramic core, narrow rod and thin ceramic core construction.

The invention includes the discovery that a very thin curved core can be held in position in a casting mold by forming a first ceramic core; coating the first ceramic core with wax or plastic pattern where metal is desired; placing the very thin curved ceramic core on the pattern; drilling a hole through the very thin ceramic core, pattern and into the first ceramic core to form a pocket; inserting a rod through the hole so that the rod is received in the pocket in the first ceramic core; covering the very thin ceramic core with a thin layer of wax or plastic pattern where a thin wall of metal is desired; forming a hole through the thin layer of wax and into the thin ceramic core so as to form an angled pocket in the first core at a predetermined position where force is needed to keep the thin ceramic core in its curved shape; inserting a portion of an outer rod through the hole in the thin layer of wax so as to be received in a pocket from in the main ceramic core or in the thin core so that upon casting the structure a passage is provided through the thin wall and into the cavity formed by the main core; and covering the thin layer of wax and the other portion of the outer rod with a ceramic shell.

The invention includes the discovery that defects in the walls of a casting, made using a ceramic shell, can be avoided by sandblasting the above-described thin layer of wax on the face closest to the ceramic shell.

The invention includes the discovery of a means for producing single-cast, thin wall structures having smooth outer surfaces and having wall thicknesses as narrow as about 0.005 inches.

The invention includes the discovery of a single-cast, thin wall hollow structure capable of withstanding impinging gases at temperatures as high as 4300° F. or higher.

Another advantage of the present invention is that finer details can be made in the thin ceramic core using a laser due to the high density of the core.

The present invention can be utilized to make structures having multiple thin walls each having a thickness less than about 0.03 inches which are connected by high thermal conductivity rods.

The present invention has a lighter weight, higher temperature capabilities and greater strength then the laminated thin wall structures of the prior art and is greatly more economical to produce.

It is possible using the techniques of the present invention to make multi-wall structures, that are connected together by high thermal conductivity rods, having more than 20 thin walls each having a thickness less than 0.03 inches. These and other discoveries, objects, features and advantages of the present invention will be apparent from the following brief description of the drawings, detailed description and appended drawings and claims.

DESCRIPTION OF THE PREFERRED EMBODIMENT

Figure 1:
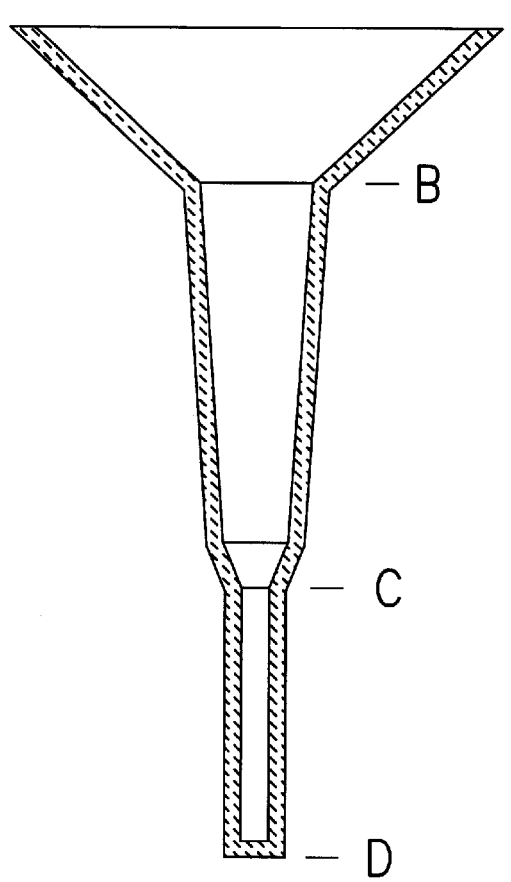
FIG. 1 is a sectional view of a prior art casting mold.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alternatives and further modifications in the illustrated device, and such further applications of the principles of the invention as illustrated therein being contemplated as would normally occur to one skilled in the art to which the invention relates.

Figure 7:
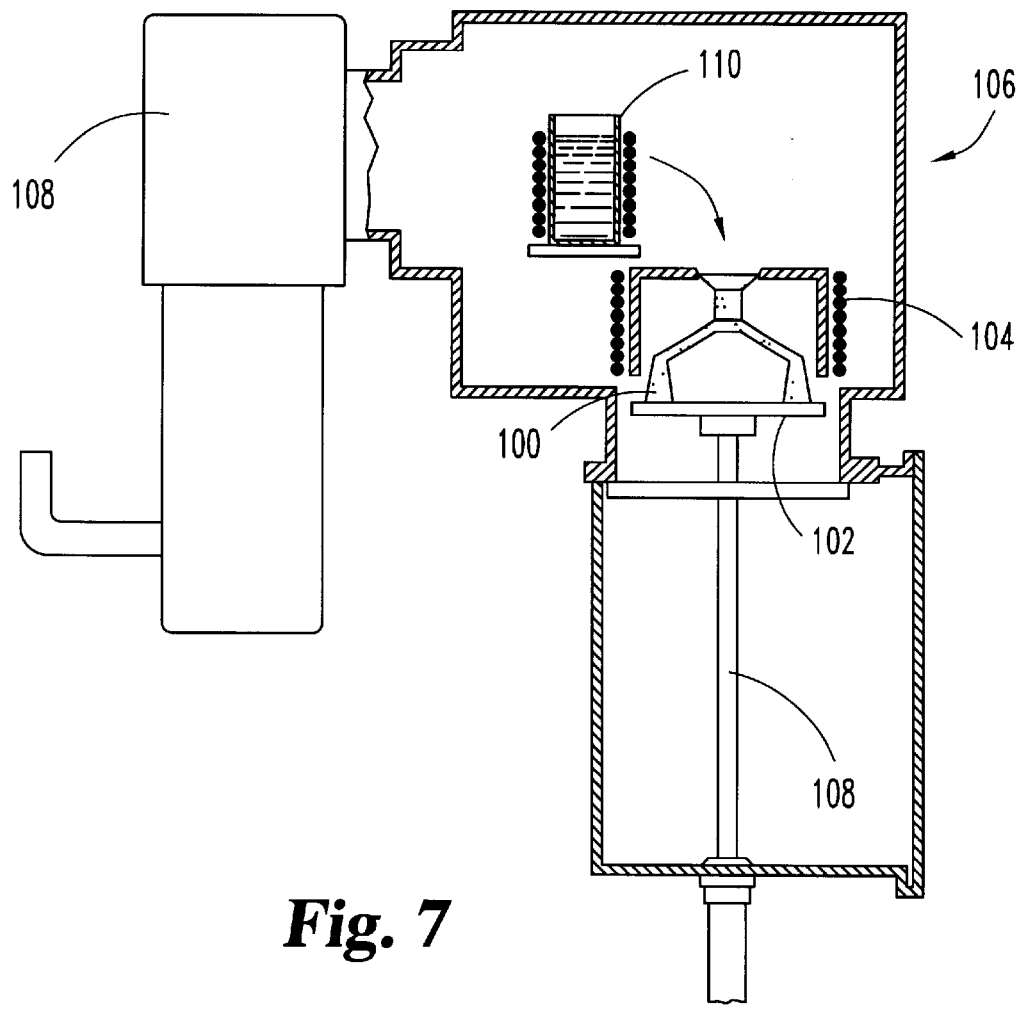
FIG. 7 is an illustration of a method of forming single crystal alloy structures.

The techniques of the present invention may be used to produce thin walled hollow structures having high thermal conductivity members connecting between the walls using equiaxed, directionally solidified and single crystal alloy processes. A variety of techniques are known for producing equiaxed, directionally solidified and single crystal alloy structures. The present invention is particularly suitable for producing very thin walled structures using single crystal casting techniques. One such single crystal casting technique is illustrated in FIG. 7, which shows a casting mold 100 carried on a water cooled chill plate 102 and received in a mold heater 104. A casting furnace 106 includes a vacuum system 108 and an induction melting crucible 110 for pouring molten alloy in the mold 100. Once the molten alloy is poured in the mold, the mold is slowly removed from the furnace by an elevator 112.

Generally, for single crystal processing, the molding temperature is preferably heated to at least 2800° and the single crystal superalloy is heated to 2800° F. and the single crystal is grown slowly at about 10 inches/hr. Generally, for equiaxed processes, the mold temperature is heated to about 1800° F. and the equiaxed alloy temperature is heated to 2800° F. and the alloy solidified at 1 mm/min.

Various types of superalloy compositions and manufacturers of such compositions are known to those skilled in the art. Most alloys of interest are complicated mixtures of nickel, chromium, aluminum and other elements.

Prior attempts to cast multi-wall structures having at least one wall less than 0.03 inches thick have been foiled by what has been known as "shell creep." In order to get molten alloy to completely fill narrow passages less than 0.03 inches thick, a substantial amount of head pressure is necessary. However, the ceramic shell used in such casting processes is not sufficiently strong enough to withstand the head pressure needed to fill these narrow passages. As a result, the head pressure causes the walls of the shell to creep outwardly thus distorting the mold and rendering the part unacceptable., This problem is particularly troublesome when casting at high temperature with slow solidification such as single crystal investment casting.

Figure 2:
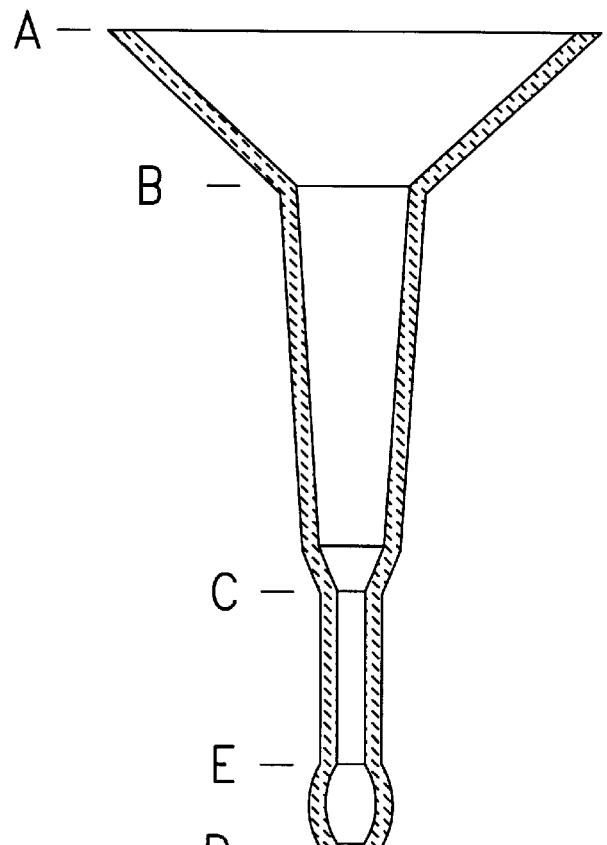
FIG. 2 is a sectional view of a prior art casting mold after the mold has creeped.

FIG. 1 illustrates a cross-sectional view of a standard mold before injecting molten alloy under pressure. The portion of FIG. 1 form points A-B represent the alloy charge reservoir, points B-C a charge runner, and points C-D the actual shape of the part to be cat. FIG. 2 illustrated a cross-sectional view of the distortion of the mold due to sustained pouring or injecting head pressure of the molten alloy. As can be appreciated from FIG. 2, maintaining the head pressure during injection of the molten alloy, causes the wall to become substantially thicker than desired. Points D-E illustrate the distortion of the casting shell due to "shell creep:" under substantial head pressure. The "shell creep" phenomenon precludes the casting of a structure with dimensional accuracy using prior processes.

Figure 3:
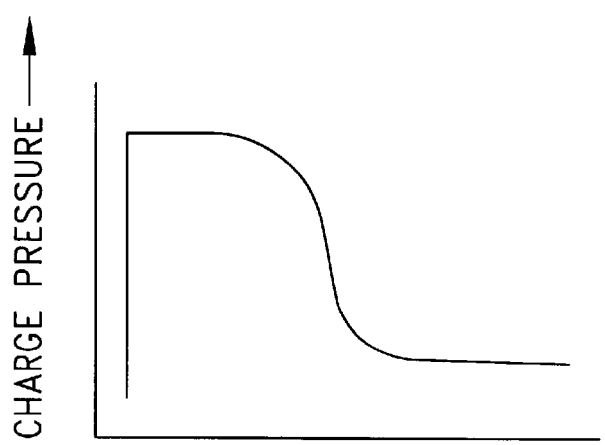
FIG. 3 is a graphic illustration of the process of varying charge pressure with time of the present invention.

The present invention includes the discovery that the problem of "creep" of a ceramic shell can be solved by varying the injection pressure of a molten alloy into a cavity, having a thickness less than about 0.03 inches, as a function of time. This concept is graphically illustrated in FIG. 3. One means of accomplishing this is illustrated in FIG. 4.

Figure 4:
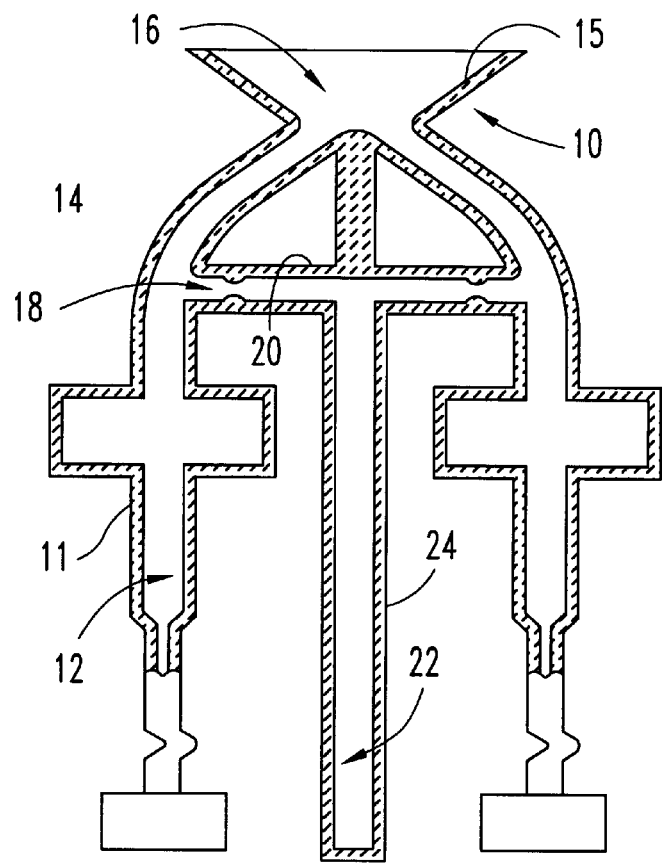
FIG. 4 is an illustration of a casting mold of the present invention.

FIG. 4 illustrates a ceramic shell 10 having a part mold 11 having a cavity 12 for producing a structure with a wall having a thickness less that about 0.03 inches. Molten alloy is injected into the cavity and allowed to solidify to form a desired structure. An alloy charge line 14 is located about the area of the mold cavity designated for the desired structure. Molten alloy is delivered from a reservoir 16 defined by container 15 through the molten alloy charge line 14 to the structure cavity of the mold. A charge pressure control means may be a control orifice 18 that is located above the structure cavity of the mold and connected to the alloy charge line. The charge pressure control means may be a bleed line 20 to remove excess alloy once the cavity has been filled and to reduce the head pressure of the molten alloy thus eliminating the undesirable "creep" of the ceramic shell. The bleed line 20 communicates with an excess alloy reservoir 22. Preferably the excess alloy reservoir 22 is located immediately below the alloy reservoir 16 and is defined by a hollow column 24 which supports container 15. A plurality of port molds 11 may be positioned radially around the column 24 with associated charge lines 14 and bleed lines 20 as described above. The typical range of head pressure for casting a wall having a thickness of less than 0.03 inches ranges from about 10 inches to about 14 inches of a nickel-based superalloy having a density of about 0.03 lbs./in.$^3$. The technique may be used to fill cavities less than 0.03 inches thick, and up to 5 feet high and 2 feet wide.

The invention includes the discovery that very thin passageways of about 0.005 to about 0.015 inches wide, can be formed using a thin core having a density greater than about 70 percent, and preferably about or greater than 99 percent. The present invention uses thin cores having a thickness less than about 0.005 to about 0.020 inches and having a density greater than about 99 percent. These cores may be made out of a ceramic material of a plastic material. It has been discovered that the high density of such thin cores gives the thin core sufficient strength to withstand core, wax pattern, mold and casting processes. A suitable material for use in such thin cores is a silica ($SiO_2$) material, commonly called quartz. The surface of the core may be patterned to provide pedestalsor indentations by machining or preferably by laser patterning. The very thin ceramic core having a thickness less than about 0.03 inches may be shaped before or after making holes in it by, for example, a process of "creep" forming over a contoured die.

Figure 6:
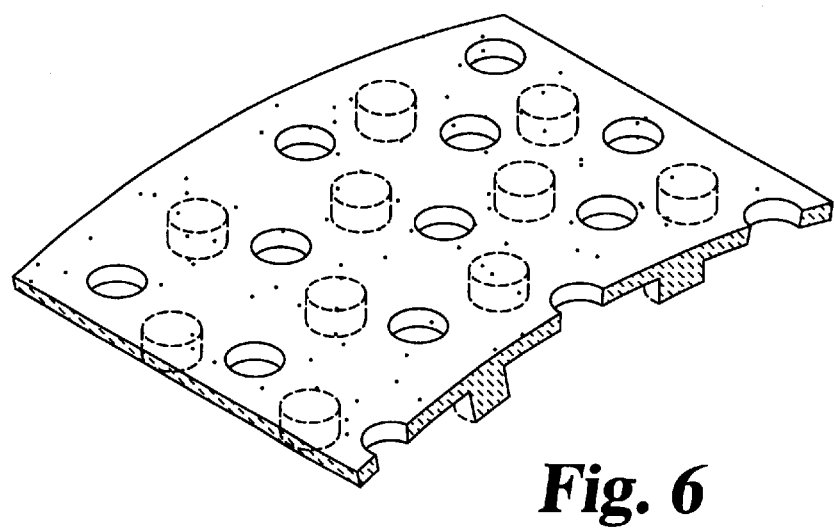
FIG. 6 is an illustrating of a thin ceramic core of the present invention.

The very thin ceramic core can be made form a variety of materials capable of withstanding the alloy casting temperatures and which can be easily removed with a strong acid or base of can be burned out ash free. A preferred material for the very thin ceramic core is quartz. FIG. 6 illustrates a suitable thin ceramic core having a pattern formed by a laser on the surface thereof. The pattern forms channels and pedestals in the cast part to increase surface area for heat exchange.

The present invention includes the discovery that a thin wall structure can be cast using high thermal conductivity rods 30' having a diameter of about 0.09 to about 0.55 inches that connect between a pair of walls in the multi wall structure. During the process of manufacturing the single cast thin wall structure the rods 30' hold the above-described thin core in place during casting. The rods 30' may be of a variety of shapes in addition to the substantially cylindrical rods depending on the desired objectives. In the preferred embodiment the high thermal conductivity rods 30' are of a different material than the thin wall structure, and the rods 30' have a higher thermal conductivity than the thin wall structure. In a more preferred embodent the rods 30' are made of NiAl, or of other similar material. The high thermal conductivity rods 30' connect to at least one of the walls of the multi wall structure and extend into the passageway interposed between a pair of the walls.

Figure 5:
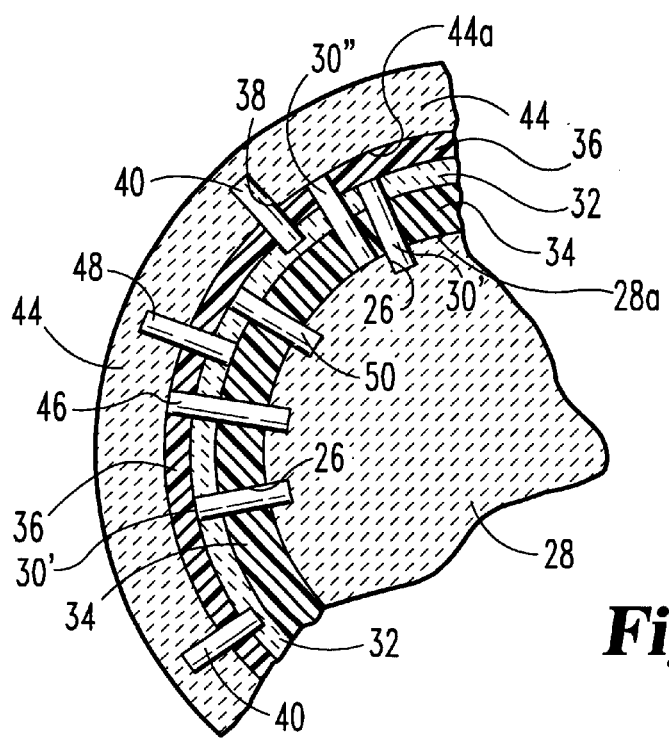
FIG. 5 is an illustration of a casting mold, pattern, core and rod combination of the present invention.
Figure 8:
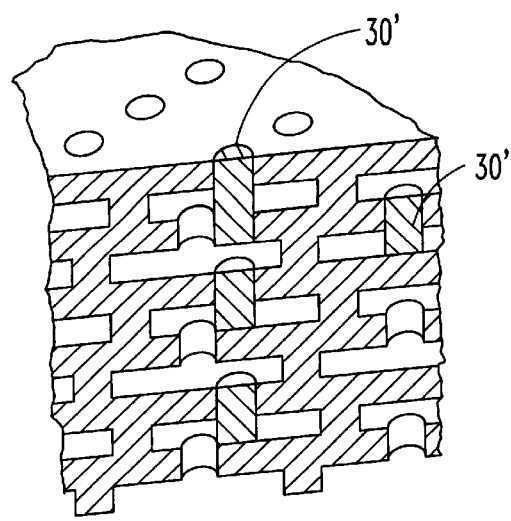
FIG. 8 is an illustration of a multi-wall structure of the present invention.

With reference to FIGS. 5 and 8, there is illustrated the high thermal conductivity rod 30'. It is understood that a plurality of high thermal conductivity rods 30' are contemplated in the multi wall structure of the present invention. The rods 30' are metallurgically bonded to the surrounding multi wall alloy structure as the metal fills in around the rods 30'. The high thermal conductivity rods 30' facilitate heat transfer between the walls of the structure. The rods 30' may extend into the pattern 36 or may just abut it depending upon the objective desired. High thermal conductivity rod 30" passes through the thin ceramic core 32 and abuts the inner surface 44a of casting shell 44 and the outer surface 28a of the main core 28. Further, rod 30" is metallurgically bonded to the surrounding multi-wall alloy structure as the metal fills in thereround. U.S. Pat. No. 5,295,530 is incorporated herein by reference. It is contemplated that in an alternate form of the present invention that a combination of holes and high thermal conductivity rods may be integrated into the walls of the mutli wall structure.

In order to cast the multi wall structure the high thermal conductivity rods 30' must be received in a pocket 26 formed in the core 28. The pocket may be formed in the core during the core molding process or may be subsequently formed in the molded core by a variety of means such as drilling or directing a laser beam on the core.

The invention includes the discovery that in one embodiment a pocket 26 can be drilled into a ceramic core 28 so as to receive and hold the above-described narrow diameter high thermal conductivity rod 30' in the ceramic core if the core to be drilled is free of the normal protective coating used in the art. The present invention includes a process which avoids using a protective coating on the ceramic core. As illustrated in FIG. 5, the ceramic core 28 free of protective coating is drilled to provide a pocket 26 for receiving and holding a narrow diameter high thermal conductivity rod 30' in the ceramic core. The high thermal conductivity rod 30' will provide after casting a thermal link between the walls of the structure, and the rod 30' passes through the thin ceramic core 32 to hold the thin ceramic core 32 in a fixed relationship between the casting shell 32 and the main core 28. The pocket 26 is made sufficiently large enough to receive the rod 30' yet small enough to firmly hold it in place and withstand any thermal expansion of the rod 30' or ceramic core during the casting process. Generally a clearance ranging from about 0.0005 to about 0.001 inches greater than the diameter of the rod is sufficient.

The present invention includes a method for holding the very thin, curved core 32 in position in the casting process. According to the present invention, a first ceramic core 28 is prepared and coated with a first pattern 34 of wax or plastic where metal is desired. Then a curved, very thin core 32 is placed on the first pattern 34 and initially located with locating pins (not shown). The locating pins are positioned near the corners of the thin core and extend into the pattern so as to temporarily hold the thin core in position while the subsequently described hole making process takes place. A hole is drilled thorugh the very thin ceramic core 32, pattern 34 and into the first ceramic core 28 to form a pocket 26 in the first core 28 for receiving and holding in place a small diameter high thermal conductivity rod 30'. A small diameter high thermal conductivity rod 30' is inserted through the hole so that the rod 30' is received in the pocket formed in the first ceramic core 28. The very thin ceramic core is then covered with a thin pattern 36 of wax or plastic (or other suitable material) where a thin wall of metal is desired. Then the holes are formed at an angle through the thin pattern 36 and into the thin ceramic core to form a pocket 38 at a predetermined position where force is needed to keep the thin ceramic core in its curved shape. Although the thin ceramic core may be already curved, the core has a resiliency or elasticity that cause it to want to move out of a curved shape such as that needed to make a gas-turbine blade. An outer rod 30 is inserted through the hole in the pocket 38 of the thin ceramic core. Rod 30 is made of quartz or a similar material. Finally, the thin pattern 36 and the other portion of the outer rod 42 are covered with a ceramic shell 44.

The thin core may also be held in position by a geometric relationship of the core and holding rods. A rod may extend through a thin curved core so that the longitudinal axis of the rod is at an angle of ninety degrees or greater to a line tangential to the curved core surface at a point near the longitudinal axis of the rod. This arrangement prevents the core from moving.

A relatively longer substantially cylindrical high thermal conductivity rod 46 extends through the thin pattern 36, thin core 32, first pattern 34 and is carried by the main core 28. A labyrinth for air flow may be formed by a first rod 48 (quartz) held on one end by the casting shell 44 and extending through the thin pattern 36 and the thin core 32. A second rod 50 (quartz) is positioned a distance laterally from the first rod 48, is held on one end by the main core 28 and extends through the first pattern 34 and the thin core 32. So that when the part is cast and the rods and cores are removed, air may flow from the outer surface of the part perpendicularly through the hole formed by rod 48 in the thin wall associated with the thin pattern 36, parallel to the thin wall through the passageway formed by the thin core 32 and perpendicular through the hole formed by rod 50 in the wall associated with the first pattern 34 out to the void left by the main core 28. It is understood that the high thermal conductivity rods are not designed to be removed after casting. This type of labyrinth provides enhanced air contact with the thin wall associated with the thin pattern 36 and provide enhanced cooling of the thin wall such that the wall, in combination with other features described herein, can withstand impinging gases at temperatures of 4300° F. and greater. Further, it is contemplated that the labrinth can be eliminated and replaced by a pair of high thermal conductivity rods. Thereafter the patterns are removed. In the case of wax patterns, the entire mold is preheated to cause the wax to flow out of the mold leaving a cavity for molten alloy and so that the cores are held firmly in place. The alloy is then cast in the mold as described above and the non high thermal conductivity rods and cores are removed, for example, with a caustic solution.

The present invention includes the discovery that defects in the wall of a casting made using a ceramic shell can be avoided by reducing the surface tension of the above-described thin layer of wax or plastic on the face closest to the ceramic shell. One way to reduce the surface tension of the wax or plastic pattern is to sandblast the pattern's outer surface.

Once the above-described thin layer of wax has been coated over the thin ceramic core, the thin layer of wax and other portions of the outer rod are covered with a ceramic shell. The ceramic shell covering is made by first dipping the thin layer of wax in a slurry having ceramic particles in a colloidal silica vehicle. A suitable ceramic powder may have a mesh size of about 325. The mold is then dipped into dry ceramic refractory powder to give strength to the shell. The process of dipping the mold into a ceramic slurry followed by dry ceramic refractory powder is repeated until a sufficient thickness of the shell is achieved, for example, a thickness of about ½ inches. The ceramic slurry and dry powder are dried in an oven at a temperature of about 72°–78° F., at 10 percent to 30 percent relative humidity during each dipping step. In this dried state, the shell may produce dust particles having a size ranging from about $1/1000$ to about $3/1000$ inch. It has been discovered that when the mold is heated the wax expands upon heating to accumulate ceramic dust particles which individually have a size ranging from about $1/1000$ to about $3/1000$ inch in sufficient amounts so as to produce in the cast structure surfaces defects having a size of $20/1000$ inch or greater. It has also been discovered that this problem can be eliminated by altering the surface tension of the wax or plastic prior to coating with the ceramic shell. Particularly suitable sandblasting material is 120 grit A1203 used at a pressure ranging from about 5 to about 10 psi.

Figure 9:
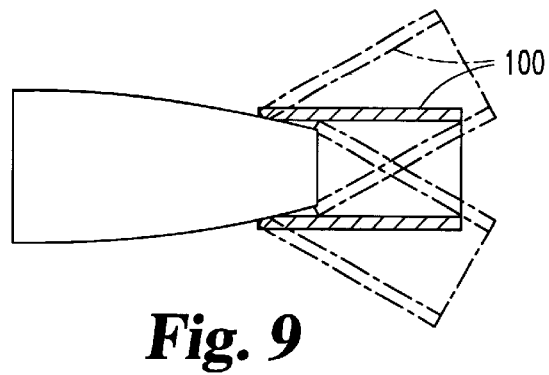
FIG. 9 is an illustration of a jet engine having nozzles made according to the present invention.
Figure 10:
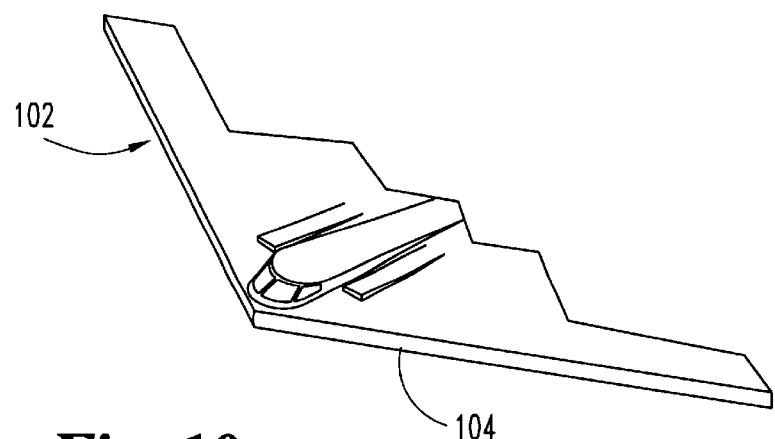
FIG. 10 is an illustration of an atmospheric air/space craft having a leading edge made from a material according to the present invention.
Figure 11:
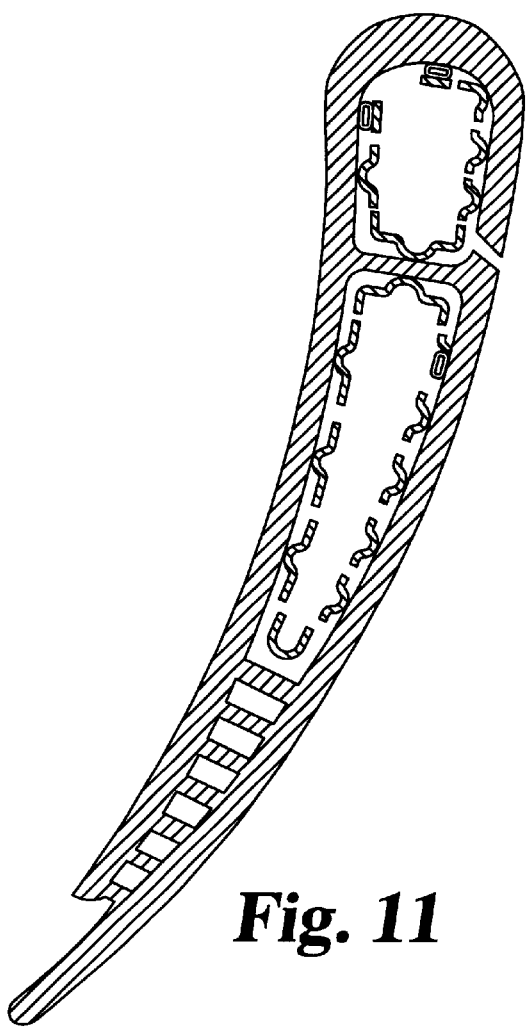
FIG. 11 is a cross-section of a prior art film cool turbine-blade.
Figure 12:
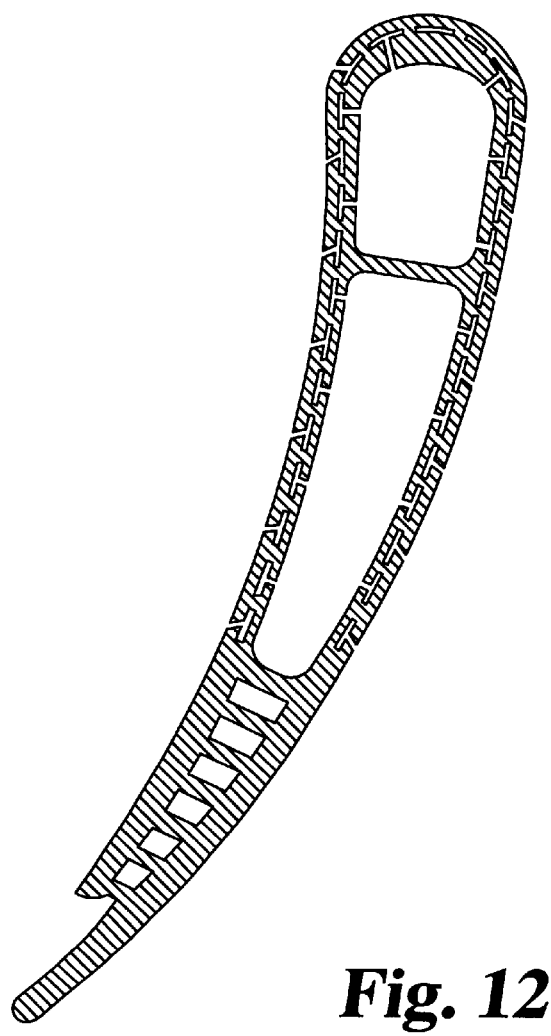
FIG. 12 is a cross-section of a single piece, single cast turbine-blade having a thin outer wall according to the present invention.
Figure 13:
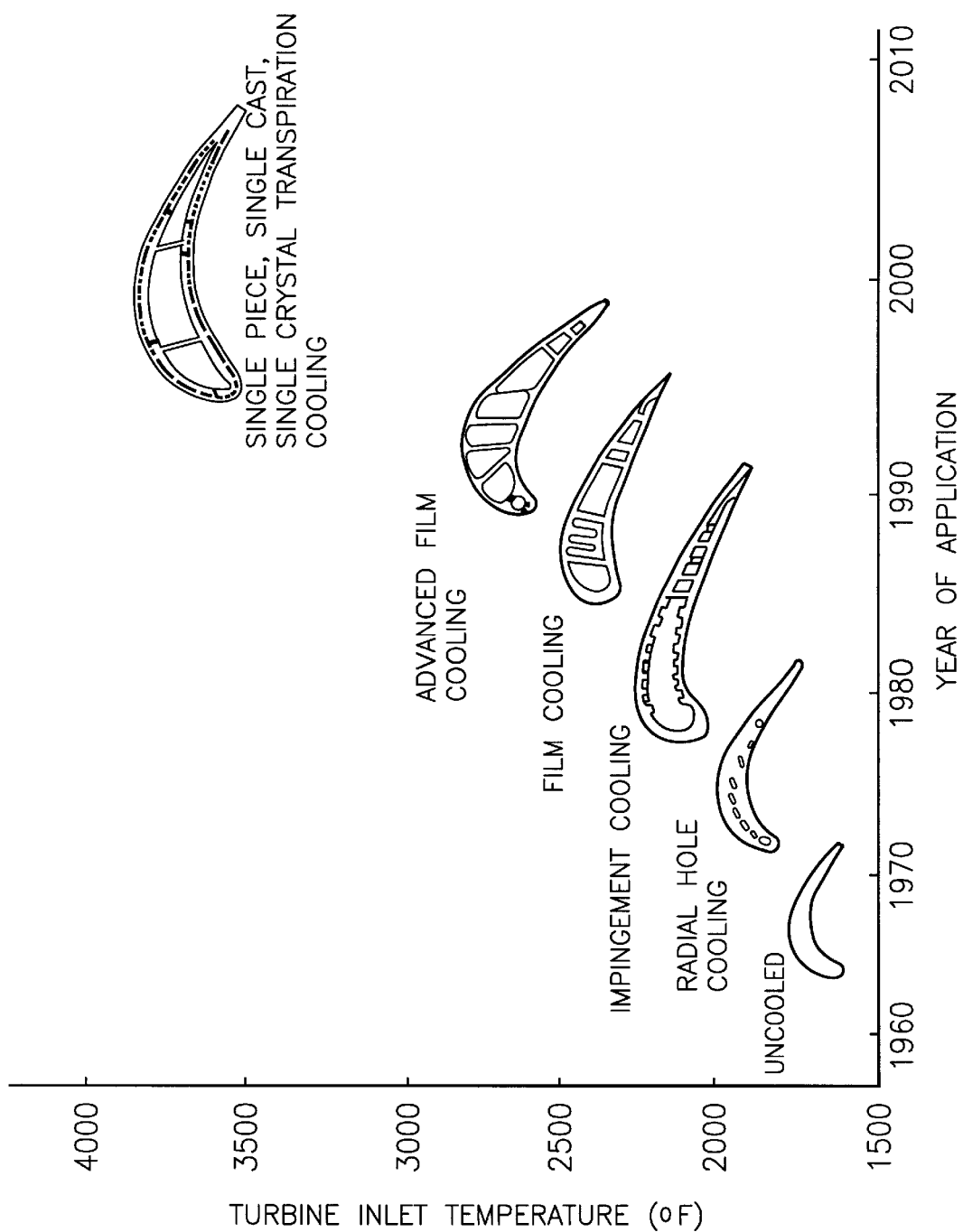
FIG. 13 is an graphic illustration of various turbine-blade designs developed over time verse practical operating turbine inlet temperatures (° F.) for gas turbine engines using the various turbine-blade designs.

Using the above-described techniques, it is possible to produce a single-cast, thin wall structure having smooth outer surfaces and a wall thickness as narrow as about 0.005 inches. FIG. 8, illustrates a single piece, thin walled, gas-turbine blade according to the present invention with portions removed. FIG. 9 is a sectional view of a single-piece, multi-wall structure according to the present invention. This single-cast, thin wall structure is capable of withstanding impinging gases at temperatures as high as 4300° F. The techniques of the present invention can be utilized to produce a variety of products which will be readily apparent from those skilled in the art including gas turbine blades such as jet engine nozzles 100 (illustrated in FIG. 9), leading edge 104 of wings and similar structures for above atmosphere air/space craft 102 (illustrated in FIG. 10). It is understood that the term airfoil will be used herein to refer to either a gas turbine blade or a gas turbine vane.

According to the present invention, a variety of thin walled hollow structure may be cast having equiaxed, single crystal and directional solidified structures. Forequiaxed structures the very thin wall may have a thickness ranging from about $10/1000$ to about $40/1000$ inches and preferably about $10/1000$ to about $15/1000$ inches. For single crystal and directional solidified structures the very thin wall may have a thickness of about $3/1000$ to about $40/1000$ inches, preferably $3/1000$–$20/1000$ inches, an most preferably about $3/1000$ to about $10/1000$ inches. Thin walled hollow structure having such thickness can be cast with dimensional accuracy using the processes of the present invention.

Then the invention or an element of the invention is defined in terms of ranges or proportions, such is intended to convey the invention as including the entire range, or any sub-range or multiple sub-ranges within the broader range. For example, when an element of the invention is described as containing about 5 to about 95 weight percent of component A. such is intended to convey the invention as also including from about 5 to 40 weight percent A, from about 20 to about 30 weight percent A, and from about 90 to about 95 weight percent A. For example, the expression $A_{5-90}B20$–70 is intended to convey the invention as including the composition of $A_{5-20}B_{2-04}$, $A_{85-90}B$ 20–25 and $A_{43}B_{57}$. For example, the expression "having a thickness ranging from about $3/1000$ to about $40/1000$ inches" is intended to convey the invention as including a thickness ranging from about $3/1000$–$5/1000$ inches, and from about $5/1000$–$15/1000$ inches.

While the invention has been illustrated and described in detail in the drawings and foregoing description, the same is to be considered as illustrative and not restrictive in character, it is being understood that only the preferred embodiment has been shown and described and that all changes and modifications that come within the spirit of the invention are desired to be protected.

What is claimed:

1. A method of making a multi-wall alloy structure comprising:

providing a main core corresponding to a void in the structure;

providing a high thermal conductivity member having a higher thermal conductivity than a thin wall in the structure which has a thickness of less than 0.03 inches;

providing a first removable pattern material covering the main core corresponding to a first wall of the structure;

providing a thin core having a density greater than 70 percent in fixed relationship to the main core so as to correspond to a thin passageway in the structure;

providing a second removable pattern material covering the thin core so as to correspond to the thin wall in the structure;

inserting the high thermal conductivity member through the thin core so that it contacts the removable patterns;

surrounding the second removable pattern with a casting mold so as to define the outer surface of the thin wall;

removing the patterns to leave the cores in fixed relationship with each other and the casting mold;

charging the casting mold with molten alloy and varying charge pressure with time so that the thin wall is formed without causing the casting mold to creep;

solidifying the molten alloy and removing the casting mold and the cores to provide the multi-wall alloy structure with the high thermal conductivity member connected thereto.

2. The method of claim 1, further comprising:

altering surface tension of the second removable pattern material to minimize formation of defects in the structure.

3. The method of claim 2, wherein said altering surface tension includes sand blasting a surface of the second removable pattern before said surrounding, and wherein in said providing the second removable pattern material includes wax.

4. The method of claim 1, further comprising:

inserting a first member through the thin core and the first removable pattern, wherein one end of the first member is held at one end by the main core;

inserting a second member through the second removable pattern and into the thin core; and removing the first member and the second member after said solidifying the molten alloy.

5. The method of claim 4, wherein said removing the first member and the second member occurs during said removing the casting mold and the cores.

6. The method of claim 4, wherein in said providing the main core includes a hole, and wherein in said inserting the first member the one end of the first member is received in the hole.

7. The method of claim 6, wherein said providing the hole in the main core includes drilling the hole.

8. A method comprising:

providing a main ceramic core;

providing a first narrow rod of a high thermal conductivity material, wherein the high thermal conductivity material has a higher thermal conductivity than a thin wall of a formed structure;

covering the main ceramic core with a first pattern where an alloy is to be cast;

placing a very thin core on the pattern, the thin core having a thickness less than about 0.02 inches and a density greater than about 70 percent, and the thin core positioned to have a curved shape;

providing a hole through the thin core, the first pattern and into the main core to form a pocket in the main core to receive a portion of the first narrow rod;

inserting a portion of the first narrow rod through the thin core so that the longitudinal axis of the first narrow rod and the outer surface of the thin core away from the main core are at substantially right angles, through the first pattern and so that a portion of the rod is firmly received in the pocket of the main core;

covering the thin core with a second pattern where an alloy is to be cast;

providing a hole through the second pattern and into the thin core to provide an angled pocket in the thin core for receiving a second rod at a predetermined position where force is needed to keep the thin core in a position such that the thin core has the curved shape;

inserting a second rod in the hole in the second pattern and so that the second rod is received in the pocket of the thin core;

surrounding the second pattern with a casting mold so that the casting mold carries one end of the second rod and so that upon removal of the patterns the cores are held in a fixed relationship to each other and the casting mold, and the thin core retains its shape;

removing the patterns;

casting the alloy into the casting mold; and removing the casting mold and the cores to provide the formed structure with the first narrow rod connected thereto.

9. The method of claim 8, further comprising:

sand blasting an outer surface of the second pattern before said surrounding.

10. The method of claim 8, further comprising:

inserting a first airflow member through the thin core and the first pattern, wherein one end of the first airflow member is held by the main core;

inserting a second airflow member through the second pattern and into the thin core; and removing the first airflow member and the second airflow member after said casting the alloy.

11. A method comprising:

providing a casting pattern;

forming narrow holes through the pattern having a diameter ranging from about 0.009 to about 0.55 inches;

providing a plurality of rods having a high thermal conductivity which is higher than a thermal conductivity of a thin wall in a formed structure;

inserting the plurality of rods through the holes to provide outwardly extending rod ends, each of the rods having a diameter slightly less than the diameter of the holes;

forming a casting mold around the pattern so that the outwardly extending rod ends are held by the casting mold;

removing the pattern;

casting molten alloy in the void left by the pattern and solidifying the molten alloy;

removing the casting mold to provide the formed structure having a portion of the plurality of rods received therein and connected with the solidified molten alloy.

12. The method of claim 11, further comprising:

sand blasting a portion of the pattern which contacts the casting mold before said forming the casting mold.

13. The method of claim 11, further comprising:

inserting a first member into the pattern;

inserting a second member into the pattern; and removing the first member and the second member after said solidifying.

14. A method of making a multi-wall alloy structure, comprising:

inserting a high thermal conductivity member having a first thermal conductivity into a casting pattern;

providing a mold around the casting pattern so that the high thermal conductivity member is supported by the mold;

removing the casting pattern to create a void;

casting molten alloy into the void left by the casting pattern;

solidifying the molten alloy, wherein the solidified molten alloy has a second thermal conductivity, and wherein the first thermal conductivity of the high thermal conductivity member is greater than the second thermal conductivity of the solidified molten alloy; and removing the mold to provide the structure having at least a portion of the high thermal conductivity member provided within the solidified molten alloy and connected with the solidified molten alloy.

15. The method of claim 14, wherein in said providing the mold includes a main core which contacts a portion of the casting pattern, a thin core provided within the casting pattern and a shell provided around the casting pattern.

16. The method of claim 15, further comprising:

providing the casting pattern, wherein said providing the casting pattern includes covering the main core with a first pattern material before said providing the thin core and covering the thin core with a second pattern material, and wherein casting pattern includes the first pattern material and the second pattern material.

17. The method of claim 16, further comprising:

sand blasting an outer surface of the second pattern after said covering the thin core.

18. The method of claim 15, wherein said providing the main core includes forming a pocket within the main core to support the high thermal conductivity member.

19. The method of claim 18, wherein said forming the pocket includes drilling the pocket into the main core.

20. The method of claim 18, wherein said forming the pocket includes molding the main core to have the pocket.

21. The method of claim 18, wherein said providing the thin core includes forming a hole within the thin core to support the high thermal conductivity member, and wherein said inserting the high thermal conductivity member includes positioning the high thermal conductivity member within the pocket of the main core and the hole of the thin core so as to prevent the thin core from moving.

22. The method of claim 15, wherein said providing the thin core includes forming a hole within the thin core to support the high thermal conductivity member.

23. The method of claim 14, further comprising:

providing a first member in the casting pattern;

providing a second member in the casting pattern; and removing the first member aid the second member after said solidifying.

24. The method of claim 14, wherein the formed structure has the entire high thermal conductivity member provided within the solidified molten alloy.

25. The method of claim 14, wherein said solidifying includes directionally the molten alloy.

* * * * *